United States Patent [19]

Wright

[11] 4,065,113
[45] Dec. 27, 1977

[54] SPRING LOADING SYSTEMS
[75] Inventor: David Allan Wright, Edinburgh, Scotland
[73] Assignee: Ferranti Limited, Hollinwood, England
[21] Appl. No.: 673,541
[22] Filed: Apr. 5, 1976
[30] Foreign Application Priority Data
Apr. 11, 1975 United Kingdom ............... 15032/75
[51] Int. Cl.² .............................................. F16F 1/04
[52] U.S. Cl. .................................... 267/156; 185/39; 267/167
[58] Field of Search ................. 267/156, 157, 59, 167; 242/107.3; 74/89.2, 89.22; 248/162; 185/37, 45, 39; 16/198

[56] References Cited
U.S. PATENT DOCUMENTS 3,039,318 6/1962 Clarke ................................... 267/156
3,291,474 12/1966 Clarke ................................... 267/156
3,698,516 10/1972 Williams .............................. 185/39

Primary Examiner—James B. Marbert
Attorney, Agent, or Firm—Cameron, Kerkam, Sutton, Stowell & Stowell

[57] ABSTRACT

A spring loading system achieves substantially zero-rate by winding an unstressed, say flat, spring strip onto a former of constant curvature so as to pass from the unstressed state through a region of predetermined shape to conform with the former. The net energy expended/released in winding/unwinding the strip is directly related to the amount of strip wound onto/off the former, whatever the total length of strip wound. The system is coupled to a driven member by an inextensible string wound on the former in opposition to the spring which is held in tension by the torque exerted on the former by the wound spring.

12 Claims, 2 Drawing Figures

SPRING LOADING SYSTEMS

THIS INVENTION relates to spring loading systems.

It is often desired that a substantially constant force is applied to a mechanical system for a range of movement of the system and/or position of application. One example of such a requirement is in counterbalancing a movable carriage, especially a vertically movable carriage, for example a probe of an inspection machine. The use of a counterpoise weight-and-pulley system may be undesirable, perhaps because of space requirements.

Previous proposals for spring loading systems, such as fusee or "tensator" mechanisms, generally use specially shaped spring holders and/or springs that are usually difficult to make and consequently expensive to buy.

It is an object of the present invention to provide a spring loading system to mitigate some or all of the above disadvantages.

According to the invention a spring loading system comprises a former surface of substantially constant curvature, a spring strip of substantially uniform cross section adapted to be wound from a naturally unstressed state to conform closely with the surface of the former in a stressed state, coupling means connected to a driven member to couple movements of the member with winding or unwinding of the strip, and means for ensuring that the strip conforms substantially to a predetermined shape for a prescribed distance away from its point of contact with the former surface, or with itself if spiral wound.

The specified conforming of the strip ensures that during winding/unwinding of the strip net energy is expended/released only in relation to the amount by which the length of strip on the former is altered. For substantially constant curvature, substantially zero-rate is achieved irrespective of the driven member position so long as the entire strip is not wound onto or unwound from the former surface, and any multiple turns are helically wound. Spiral winding may be used if requirements allow a sufficient spring rate tolerance in relation to strip thickness and curvature of the former surface.

The former surface may be the surface of a cylindrical drum.

The spring loading system may then include a flexible, preferably inextensible, elongate member, such as a strip, string or wire, fastened between the former surface and a suitable anchorage which may be on the driven member.

In one embodiment both the elongate member and the spring strip are anchored to the driven member which is thus prestressed to co-operate with tension in the elongate member to conform the strip as required.

In another embodiment the elongate member follows a prescribed path, e.g., over a pulley, and is anchored to the spring strip by which it is tensioned to serve as the conforming means. An attachment point may be provided between the driven member and the elongate member.

In a further embodiment only the elongate member is anchored to the driven member, and independent conforming means is provided, for example by guide rollers.

Specific embodiments of the invention will now be described, by way of example, with reference to the driving, in which.

Figure 1:
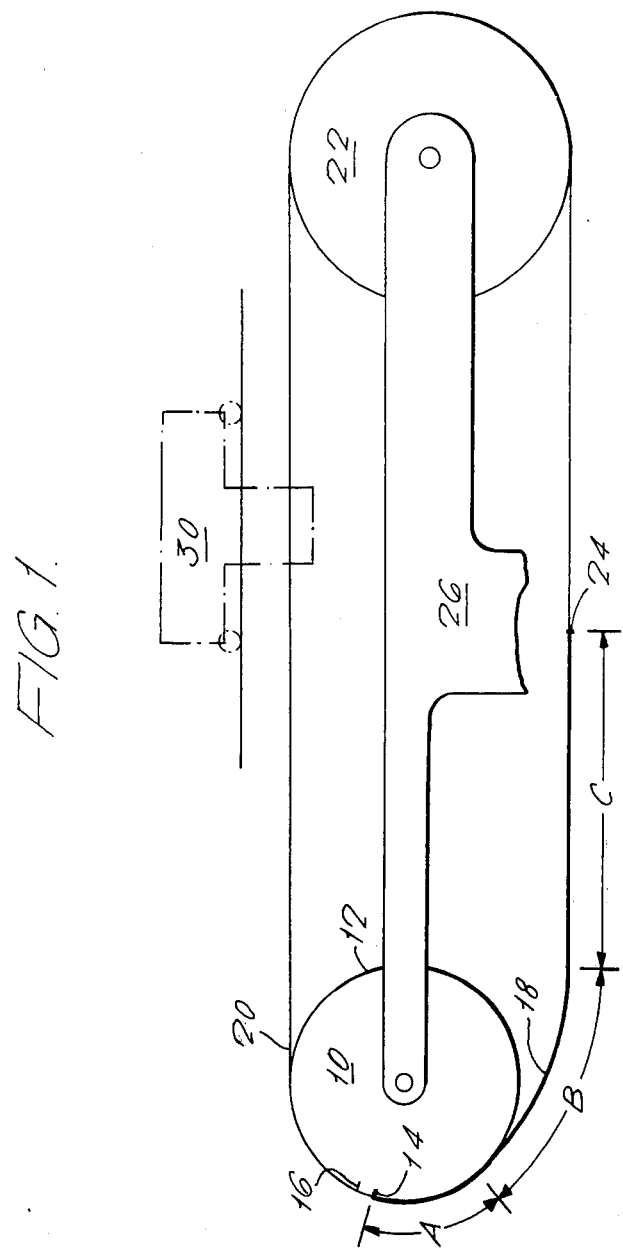
FIG. 1 shows a zero-rate spring loading system.

In FIG. 1 a drum 10 provides a cylindrical former surface 12 with anchorage points 14 and 16 for ends of a spring strip 18 and a substantially inextensible string or wire 20, respectively. The string or wire 20 passes over a pulley 22 and returns substantially parallel with itself to an anchorage 24 at the free end of the spring strip 18. Both the drum 10 and the pulley 22 are rotatably journaled in a frame 26.

The string or wire 20 is tensioned by the spring strip 18 which is shown partially wound onto the former surface 12. This partial winding of the spring strip 18 can be characterized by three distinct sections A, B, and C. A corresponds to where the strip 18 conforms to the former surface 12 and so is of constant curvature, C to where the strip 18 is straight, and B to the transition from constant curvature to straight. So long as there is a portion B a shown, i.e., substantially conforming to a predetermined shape over a substantially constant length, net energy expended or released will correspond entirely to changes in the length of portion A which is of constant curvature resulting in zero-rate action. If the portion A comprises more than one turn, zero-rate action will be retained if the windings are helical i.e., each in contact with the former surface 12. Spiral winding of the strip 18 with closely contacting turns will produce error related to strip thickness and former surface curvature, but this may be tolerable for some applications.

If there may be more than one complete turn of the strip 18, the string 20 can be connected fixedly or by a slidable mount to a further string connected at anchorages on the drum 10 that are spaced axially, or two strings 20 can be used one from each such anchorage.

A driven member is indicated schematically at 30 by dashed lines as comprising a trolley running on wheels on a horizontal surface, the trolley being connected to the string 20 at a convenient position for movement therewith such that the string comprises coupling means between the driven member and movement of the spring. This is, of course, merely by way of example. The driven member may be of any type wheeled or unwheeled, though it will generally be associated with convenient guides, and may move other than horizontally.

Figure 2:
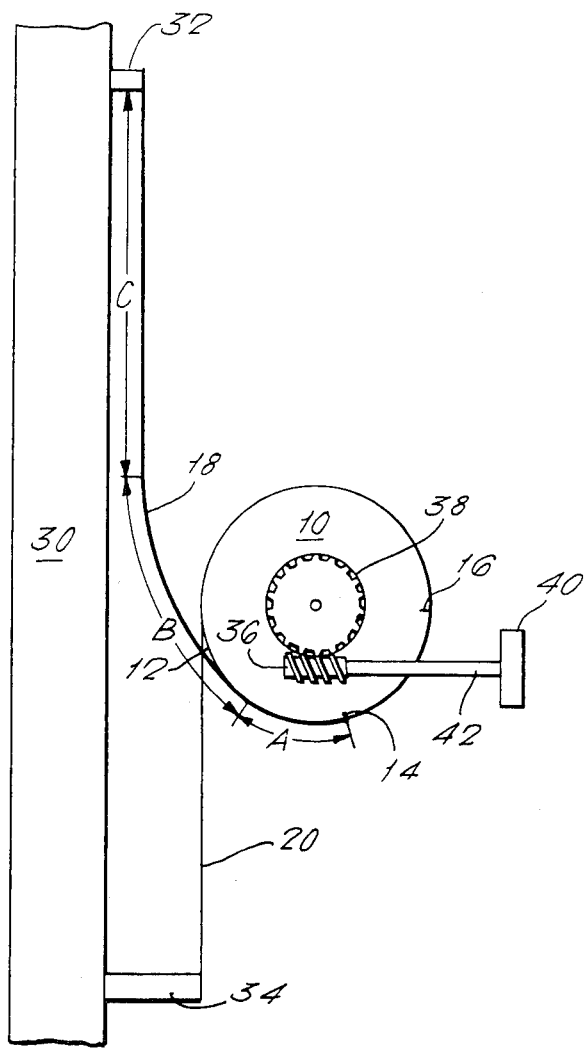
FIG. 2 shows another zero-rate spring loading system.

In FIG. 2 the same references are used as in FIG. 1 for the same or equivalent parts. The driven member 30 is indicated as being vertically movable, though no guides are indicated. The strip 18 and the string 20 are shown connected to spaced anchorage positions 32 and 34, respectively, on the driven member 30 which must thus be able to withstand the prestress required by the strip 18, and consequent tension in the string 20, in order to establish the portion B of the strip 18 that is to be of predetermined length and shape. The driven member 30 may be a vertical probe of an inspection and/or measuring machine.

The inextensible string 20 may be utilized in fine adjustment of the carriage 30 and worm 36 and wheel 38 drive is shown to effect this via an adjustment knob 40 on the same shaft 42 as the worm 36, the wheel 38 being fixed to the drum 10. As such a string is necessary for fine adjustment on an inspection machine mechanisms as herein disclosed using both a spring and a string are particularly suitable.

It would be possible to modify the system of FIG. 2 to avoid the prestress on the driven member 30. Then, the strip 18 would need to be guided, say by a succession of rollers, to establish the portion B and to keep the strip tight on the drum surface 12. Suitable rollers could be disposed along the path of portion B to engage the outer face of the strip 18 (relative to the drum). Similar rollers could be continued round and close to, perhaps even relatively strongly spring loaded against, the drum surface 12. Alternatively, the stip 18 may be pushed into a cylindrical cavity to conform to the inner circumferential surface thereof, so long as the strip will not buckle in the process. The cylindrical cabity may be a hollow drum having a continuous internal surface, possibly lined with a low-friction material, or may be formed by a plurality of rollers arranged to define a cylinder.

In the above embodiments the coupling means described has been an elongate member in the form of an inextensible string. The elongate member may take the form of a spring strip similar to that 18 but of lower rate to modify the effect of the spring 18 described above.

Furthermore, the coupling means may take a form other than an elongate member, for example a system of gears connecting the driven member to the drum comprising the former, provided of course, precautions are taken to guide and hold the spring in relation to the former.

What I claim is:

1. A spring loading system comprising a former surface of substantially constant curvature, a spring strip of substantially uniform cross section adapted to be wound from a naturally unstressed state to conform closely with the surface of the former in a stressed state, coupling means connectd to a driven member to couple movements of the member with winding or unwinding of the strip, and means for ensuring that the strip conforms substantially to a predetermined shape for a prescribed distance away from its point of contact with the former surface, or with itself if spiral wound.

2. A spring loading system as claimed in claim 1 in which the spring strip is naturally substantially straight.

3. A spring loading system as claimed in claim 1 in which the former surface comprises the internal wall of a cylindrical cavity.

4. A spring loading system as claimed in claim 3 in which the cylindrical cavity is defined by a plurality of rollers.

5. A spring loading system as claimed in claim 1 in which the means for conforming the strip to a predetermined shape comprises a plurality of guide rollers.

6. A spring loading system as claimed in claim 1 in which the former surface comprises the external surface of a cylindrical drum.

7. A spring loading system as claimed in claim 6 in which the coupling means comprises a flexible elongate member fastened between a suitable anchorage on the driven member and the former surface so as to be wound onto and off the surface in opposition to the strip.

8. A spring loading system as claimed in claim 7 in which the elongate member is inextensible.

9. A spring loading system as claimed in claim 7 in which the elongate member is a further spring strip.

10. A spring loading system as claimed in claim 7 in which both the elongate member and the spring strip are attached to the driven member, the driven member being prestressed thereby to co-operate with tension in the elongate member to conform the strip to said predetermined shape.

11. A spring loading system as claimed in claim 7 in which the elongate member follows a prescribed path and is anchored to the spring strip by which it is tensioned to serve as the conforming means.

12. A spring loading system as claimed in claim 11 in which the elongate member passes over a pulley located at a fixed distance from the former surface.

* * * * *